US008914631B2

(12) United States Patent
Shukla (10) Patent No.: US 8,914,631 B2
(45) Date of Patent: Dec. 16, 2014

(54) PERFORMING SECURE AND NON-SECURE COMMUNICATION OVER THE SAME SOCKET

(75) Inventor: Amitabh Shukla, Deoghar (IN)

(73) Assignee: Oracle International Corporation, Redwood Shores, CA (US)

( * ) Notice: Subject to any disclaimer, the term of this patent is extended or adjusted under 35 U.S.C. 154(b) by 1147 days.

(21) Appl. No.: 12/496,270

(22) Filed: Jul. 1, 2009

(65) Prior Publication Data

US 2011/0004752 A1  Jan. 6, 2011

(51) Int. Cl.
*H04L 29/06* (2006.01)
*G06F 21/60* (2013.01)

(52) U.S. Cl.
CPC ............... *H04L 69/16* (2013.01); *H04L 63/18* (2013.01); *H04L 63/0428* (2013.01); *G06F 21/602* (2013.01); *H04L 69/22* (2013.01); *H04L 69/161* (2013.01); *H04L 63/166* (2013.01)
USPC ........... 713/160; 713/151; 709/223; 709/227; 709/237

(58) Field of Classification Search
CPC ........... G06F 21/602; H04L 9/00–9/38; H04L 63/0428–63/0492; H04L 63/16–63/168; H04L 63/18
USPC .......... 709/220, 222, 223–237; 713/150–152, 713/160
See application file for complete search history.

(56) References Cited

U.S. PATENT DOCUMENTS

| | | | |
|---|---|---|---|
| 5,907,621 A | 5/1999 | Bachman et al. | |
| 6,836,795 B2 | 12/2004 | Soderberg et al. | |
| 7,069,434 B1 | 6/2006 | Ilnicki et al. | |
| 7,076,207 B2 | 7/2006 | Kurosawa et al. | |
| 7,249,377 B1 | 7/2007 | Lita et al. | |
| 7,302,564 B2 | 11/2007 | Berlin | |
| 7,441,119 B2 | 10/2008 | Brabson et al. | |
| 2003/0167394 A1* | 9/2003 | Suzuki et al. | 713/168 |
| 2005/0149718 A1* | 7/2005 | Berlin | 713/151 |
| 2006/0085504 A1 | 4/2006 | Yang et al. | |
| 2006/0210071 A1* | 9/2006 | Chandran et al. | 380/42 |
| 2009/0187820 A1* | 7/2009 | Stinson et al. | 715/238 |

FOREIGN PATENT DOCUMENTS

| | | |
|---|---|---|
| EP | 1395016 A1 | 3/2004 |
| WO | 9844693 A1 | 10/1998 |
| WO | 2006010058 A2 | 1/2006 |

OTHER PUBLICATIONS

Fielding et al. Network Working Group, Request for Comments: 2616, "Hypertext Transfer Protocol—HTTP/1.1". Published: Jun. 1999. <http://www.ietf.org/rfc/rfc2616.txt>.*

(Continued)

*Primary Examiner* — Evans Desrosiers
*Assistant Examiner* — Kevin Bechtel
(74) *Attorney, Agent, or Firm* — Miles & Stockbridge, P.C.

(57) ABSTRACT

A packet processing type determiner includes a non-secure packet processing module configured to process packets received over a single socket using a non-secure protocol. The packet processing type determiner also includes a data indicator checking module configured to check the packets for a first indicator denoting a beginning of a secure data record. The packet processing type determiner further includes a secure packet processing module configured to use a secure protocol to process the packets when a packet with the first indicator is detected until a packet with a second indicator denoting an end of the secure data record is detected.

18 Claims, 4 Drawing Sheets

(56) References Cited

OTHER PUBLICATIONS

Khare et al. Network Working Group, Request for Comments: 2817, "Upgrading to TLS Within HTTP/1.1". Published: May 2000. <http://www.ietf.org/rfc/rfc2817.txt>.*

Oreilly; "Apache Cookbook"; http://www.onlamp.com/pub/a/apache/2004/01/29/apache_ckbk.html; Jan. 29, 2004.

"SSL and CRL Checking with GlassFish V2"; http://weblogs.java.net/blog/kumarjayanti/archive/2007/11/ssl_and_crl_che.html; Nov. 19, 2007.

"How can I hide parts of a page?"; http://help.mamboserver.com/index.php?option=com_content&task=view&id=131&Itemid=75; Apr. 23, 2009.

Twelve Dynamic HTML Lessons; http://www.devx.com/projectcool/Article/18103; Apr. 23, 2009.

Gilmore et al.; "Secure remote access to an Internet Web server"; IEPP Network; Nov./Dec. 1999; pp. 31-37.

Freudenthal et al.; "Switchboard: Secure, Monitored Connections for Client-Server Communication"; Proceedings of the 22nd International Conference on Distributed Computing Systems Workshops (ICDCSW'02); IEEE Computer Society; 2002.

Bisel; "The Role of SSL in Cybersecurity"; Published by the IEEE Computer Society; IT Pro Mar./Apr. 2007; pp. 22-25.

"How do I enable Secure Sockets Layer (SSL) connections to my Microsoft Virtual Server 2005 system?"; http://windowsitpro.com/article/articleid/48990/how-do-i-enable-secure-sockets-layer-ssl-connections-to-my-miscrosoft-virtual-server-2005-system.html; Jan. 29, 2006.

"Configuring SSL only for the login process"; http://publib.boulderibm.com/infocenter/lqkrhelp/v8r0/index.jsp?topic=/com.ibm.lotus.quickr.admin.wpv81.docwpf/ssl.html; Dec. 8, 2008.

"Enabling SSL on selected resources in IIS"; http://blogs.techconception.com/manny/2008/03/13/EnblingSSLOnSelectedResourcesInIIS.aspx; Mar. 13, 2008.

Jones et al.; "How to Implement Secure TCP Communications in Microsoft.Net 2.0"; http://dotnet.sys-con.com/node/11335; Jul. 29, 2005.

Arora; "Send secure/non-secure attachments over SOAP and HTTP"; http://www.ibm.com/developerworks/webservices/library/ws-attach.html; Nov. 22, 2005.

"Janus Network Security"; http://sirius-software.com/marketing/jsecure.html; Jan. 21, 2009.

Internet Security for Embedded Systems:; http:www.interpeak.com/files/embedded_internet.pdf; 2005.

* cited by examiner

PERFORMING SECURE AND NON-SECURE COMMUNICATION OVER THE SAME SOCKET

FIELD

One embodiment is directed generally to a network computing system, and in particular to a network computing system that performs both secure and non-secure communication.

BACKGROUND

If an application running on a first computer is to perform both secure and non-secure communication with a second computer, the application must open two sockets with the second computer: one for secure communication and the other for non-secure communication. A socket is generally understood as an Application Programming Interface ("API") of an operating system that delivers incoming data packets to the appropriate application process or thread based on a combination of local and remote Internet Protocol ("IP") addresses and port numbers. For instance, a socket of the aforementioned second computer that is opened for non-secure communication with the application of the first computer may include the IP address of the second computer as well as a designated port (such as port 80 for Hypertext Transfer Protocol ("HTTP")). Each socket is generally mapped to a communicating application process or thread. However, computers generally have both a per-process limit and a global (overall) limit on the number of open descriptors that describe each socket, thus limiting the total number of sockets. When these limits are reached, the available sockets are said to be exhausted and further sockets generally cannot be opened without closing previously opened sockets.

SUMMARY

In an embodiment, a packet processing type determiner includes a non-secure packet processing module configured to process packets received over a single socket using a non-secure protocol. The packet processing type determiner also includes a data indicator checking module configured to check the packets for a first indicator denoting a beginning of a secure data record. The packet processing type determiner further includes a secure packet processing module configured to use a secure protocol to process the packets when the first indicator is detected in a packet until a packet with a second indicator denoting an end of the secure data record is detected.

BRIEF DESCRIPTION OF THE DRAWINGS

In order that the embodiments of the invention will be readily understood, a more particular description of the invention briefly described above will be rendered by reference to specific embodiments that are illustrated in the appended drawings. While it should be understood that these drawings illustrate only typical embodiments of the invention and are not therefore to be considered to be limiting of its scope, the invention will be described and explained with additional specificity and detail through the use of the accompanying drawings, in which.

DETAILED DESCRIPTION

It will be readily understood that the components of various embodiments of the present invention, as generally described and illustrated in the figures herein, may be arranged and designed in a wide variety of different configurations. Thus, the following more detailed description of the embodiments of an apparatus, system, and method of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments", "some embodiments", or similar language means that a particular feature, structure, or characteristic described in connection with the embodiment is included in at least one embodiment of the present invention. Thus, appearances of the phrases "in certain embodiments", "in some embodiments", "in other embodiments", or similar language throughout this specification do not necessarily all refer to the same group of embodiments and the described features, structures, or characteristics may be combined in any suitable manner in one or more embodiments.

In addition, while the term "computer" has been used in the description of some embodiments of the present invention, the invention may be applied to many types of network computing devices. For purposes of this invention, the term "computer" includes servers, rack computing systems, cloud computing systems, distributed computing systems, personal computers, laptops, cell phones, personal digital assistants, tablet computing devices, mainframes, any networked devices that perform computing operations, and any equivalents thereof.

One embodiment is a packet processing type determiner that facilitates both secure and non-secure communication for an application over a single port, rather than using two or more ports. Therefore, the packet processing type determiner may enable a computer to communicate with more applications, or open more ports for already running applications, than is possible with conventional technology.

Figure 1:
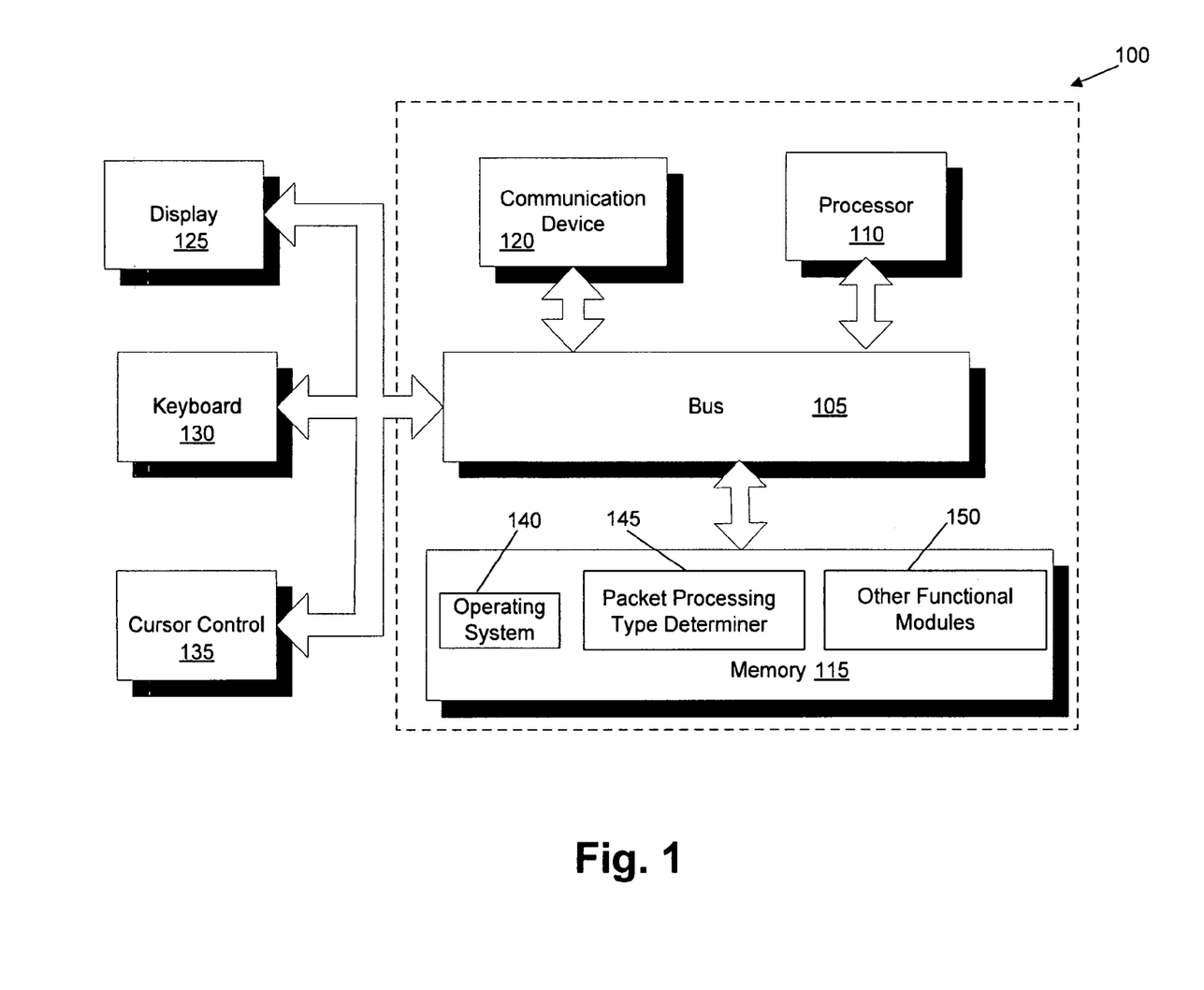
FIG. 1 is a block diagram of a computer having a packet processing type determiner that can implement an embodiment of the present invention.

FIG. 1 is a block diagram of a computer 100 that can implement an embodiment of the present invention. Computer 100 includes a bus 105 or other communication mechanism for communicating information, and a processor 110 coupled to bus 105 for processing information. Processor 110 may be any type of general or specific purpose processor, including a central processing unit ("CPU") or application specific integrated circuit ("ASIC"). Computer 100 further includes a memory 115 for storing information and instructions to be executed by processor 110. Memory 115 can be comprised of any combination of random access memory ("RAM"), read only memory ("ROM"), flash memory, cache, static storage such as a magnetic or optical disk, or any other types of computer readable media or combination thereof. Additionally, computer 100 includes a communication device 120, such as a network interface card, to provide access to a network. Therefore, a user may interface with computer 100 directly, or remotely through a network or any other method.

Computer readable media may be any available media that can be accessed by processor 110 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 110 is further coupled via bus 105 to a display 125, such as a Liquid Crystal Display ("LCD"), for displaying information to a user, such as web pages and other software applications. A keyboard 130 and a cursor control device 135, such as a computer mouse, is further coupled to bus 105 to enable a user to interface with computer 100.

In one embodiment, memory 115 stores software modules that provide functionality when executed by processor 110. The modules include an operating system 140 that provides operating system functionality for computer 100. The modules further include a packet processing type determiner 145 that is configured to facilitate both secure and non-secure communication for an application over a single port. Computer 100 can be part of a larger system such as a cluster computing system, a distributed computing system, a cloud computing system, a "server farm" or any other system having multiple computers and/or computing devices. Computer 100 will typically include one or more additional functional modules 150 to include additional functionality. In some embodiments, packet processing type determiner 145 may be part of operating system 140 or part of one or more other functional modules included in other functional modules 150.

It should be noted that many of the functional features described in this specification have been presented as modules in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be at least partially implemented in software for execution by various types of processors. An identified unit of executable code in a software module may, for instance, comprise one or more physical or logical blocks of computer instructions which may, for instance, be organized as an object, procedure or function. Nevertheless, the executables of an identified module need not be physically located together, but may comprise disparate instructions stored in different locations that, when joined logically together, comprise the module and achieve the stated purpose for the module. Modules may be stored on a computer-readable medium, which may be, for instance, a hard disk drive, a flash device, random access memory ("RAM"), a tape drive, an optical drive, a compact disk having read-only memory ("CD-ROM") or a digital video disk having read-only memory ("DVD-ROM"), or any other such medium used to store data. The medium may be read-only or read/write.

Indeed, a unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
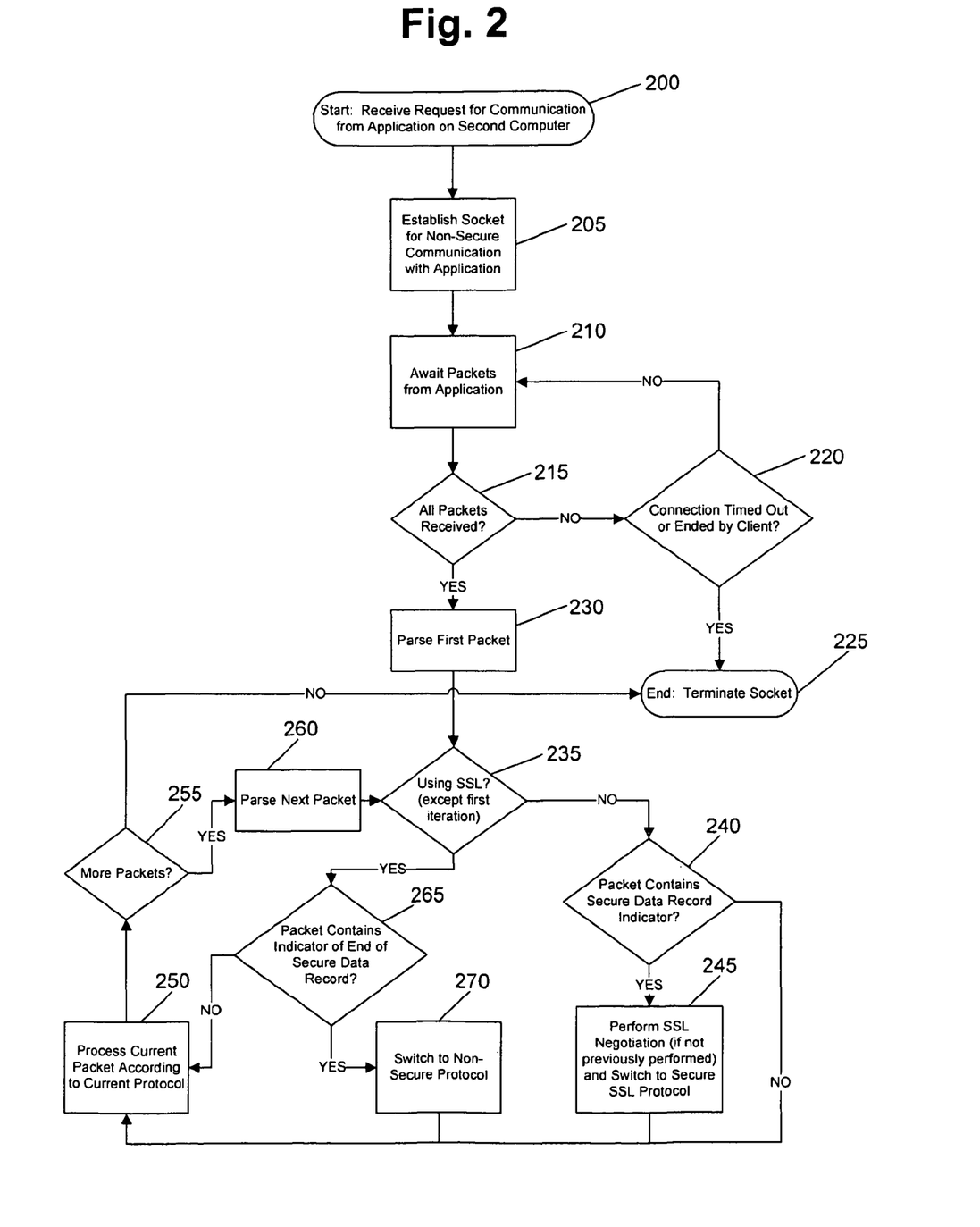
FIG. 2 is a flow diagram illustrating a process flow for processing both secure and non-secure packets according to an embodiment of the present invention.

FIG. 2 is a flow diagram illustrating a process flow for processing both secure and non-secure packets according to an embodiment of the present invention. In some embodiments, the functionality of FIG. 2, and FIG. 3 below, is implemented by software stored in memory or other computer readable media, and executed by a processor. In other embodiments, the functionality may be performed by hardware (e.g., through the use of an ASIC, a programmable gate array ("PGA"), a field programmable gate array ("FPGA"), etc.), or any combination of hardware and software.

In some embodiments, the process of FIG. 2 may be performed, for example, by computer 100 of FIG. 1 (i.e., the "first computer") via packet processing type determiner 145. In FIG. 2, the process flow begins with a first computer receiving a request for communication from an application running on a second computer at 200. Clearly, the application running on the second computer may request, and send, numerous communications to and from the first computer. The first computer then establishes a socket for non-secure communication with the application at 205. In protocols such as Transmission Control Protocol/Internet Protocol ("TCP/IP"), communication from the application will be divided into packets and sent to the first computer. The packets may take different routes in the network over which the first computer and the second computer are communicating (such as a corporate Intranet, the Internet or any other network suitable for packet-based communication), and may arrive in a different order than that in which they were sent. The second computer sends information to the first computer indicating the number of packets that are to be sent, and numbers each packet accordingly in the headers thereof.

Once the first computer establishes a socket for non-secure communication with the application at 205, the first computer then awaits the packets from the application at 210. When a packet is received by the first computer, the packet is acknowledged in an "ACK" message to the second computer. If a packet is not received after a certain period of time, the first computer requests resending of the packet from the second computer via a negative acknowledgement, or "NACK", message. In some implementations, the first computer may acknowledge multiple packets in a single ACK, or request the resending of multiple packets in a single NACK. The packets are then reassembled in order at the first computer. These operations, as well as other TCP/IP operations, would be readily appreciated by one of ordinary skill in the art.

The first computer periodically checks whether packets from the application have been received on the socket. If all packets have not been received at 215 and the connection has either timed out or been ended by the application at 220, the socket is terminated at 225 and the process ends. On the other hand, if all of the packets have not been received at 215 and the connection is still active, the first computer continues to await packets from the application on the socket at 210. In some embodiments, the first computer may begin processing the data packets before the entire communication is received, particularly if the communication is large.

Once all of the packets of the communication from the application have been received at 215, the first computer parses the first packet at 230. For the first packet, the first computer does not need to make a determination of whether SSL is currently being used at 235 since the first computer is initially using a non-secure protocol, and will default to the "NO" branch. The first computer then checks whether the first packet contains a secure data record indicator indicating the beginning of a secure data record at 240. This indicator may be marked by a certain value in the out of band data byte of the packet. For instance, the value 0xFA (denoted in hex, or 11111010 in binary) for the out of band data byte may indicate the beginning of a secure data record. The secure data record often spans multiple packets. While certain values in the out of band byte of a TCP packet are discussed with respect to indicators pertaining to secure data records, these are used for example only and other fields and/or values are both possible and clearly within the scope of the present disclosure.

If the secure data record indicator marks the beginning of a secure data record, the first computer detects the secure data record indicator and switches to Secure Sockets Layer ("SSL") protocol at 245. If not previously established, this generally requires the first computer and second computer to perform an SSL negotiation to establish an SSL session. SSL negotiation is discussed in more detail with respect to FIG. 3 below. While the negotiation is performed at this stage in FIG. 2, in some embodiments, the SSL negotiation may be performed in advance, such as prior to sending data packets by the application. This allows the first computer to use the SSL protocol over the socket to read/write/interpret the data sent by the application. While SSL is discussed in this example, it would be readily appreciated by one of ordinary skill in the art that Transport Layer Security ("TLS") or any other applicable security protocol may be used.

If the secure data record indicator does not mark the beginning of a secure data record, the first computer will not switch to SSL. The first computer then processes the packet according to the current protocol at 250. If more packets remain to be processed from the communication at 255, the first computer parses the next packet at 260 and repeats the process for the next packet at 235. If there are no more packets to process at 255, the first computer then terminates the socket at 225. While the socket is terminated in this example, one of ordinary skill in the art will readily appreciate that the socket may remain open to receive future communications from the application.

For subsequent packets, the first computer will check to see whether SSL is currently being used at 235. If the secure data record indicator of a previously processed packet indicated a secure data record, the protocol will have been switched to SSL and the "YES" branch of 235 will then be taken for subsequent packets. While SSL is being used, the first computer checks whether the current packet contains a secure data record indicator indicating the end of the present secure data record at 265. This indicator may also be marked by a certain value in the out of band data byte of the packet. For instance, the value 0xFE (denoted in hex, or 11111110 in binary) for the out of band data byte may indicate the end of the secure record.

If the secure data record indicator marks the end of the secure data record, the first computer detects the secure data record indicator and switches back to the non-secure protocol at 270. If the secure data record indicator does not mark the end of the secure data record, the first computer will not change the security and will continue to use SSL on future packets. The first computer then processes the packet according to the current protocol at 250 and repeats the operations with respect to subsequent packets discussed above and illustrated in the flowchart of FIG. 2. In some embodiments, packets containing an indicator of the beginning or end of a secure data record may be used for the sole purpose of informing the first computer of the secure data record and may lack a payload.

Since in public key infrastructure ("PKI") encryption, for instance, the larger the key size that is used, the more processing that is generally required, it may make sense in some implementations to use a level of encryption that corresponds with the level of sensitivity of the information. For example, in the case of a bank website, a longer key (such as 128 bit, 192 bit or 256 bit) may be used for highly sensitive information, such as a customer's username/password and account number, and a shorter key (such as 64 bits) may be used for less sensitive information, such as a static statement of account balances. While it is desired that third parties not see the less sensitive information, such information likely cannot be used to access or manipulate the account, unless used for verification by the bank over the phone when a purported customer calls the bank. If certain information is used for such telephonic verification, it is clear that a higher level of security may be desired for that information. Any key length and any number of different security levels for different data may be assigned and implemented by design choice and are within the scope of this disclosure.

Figure 3:
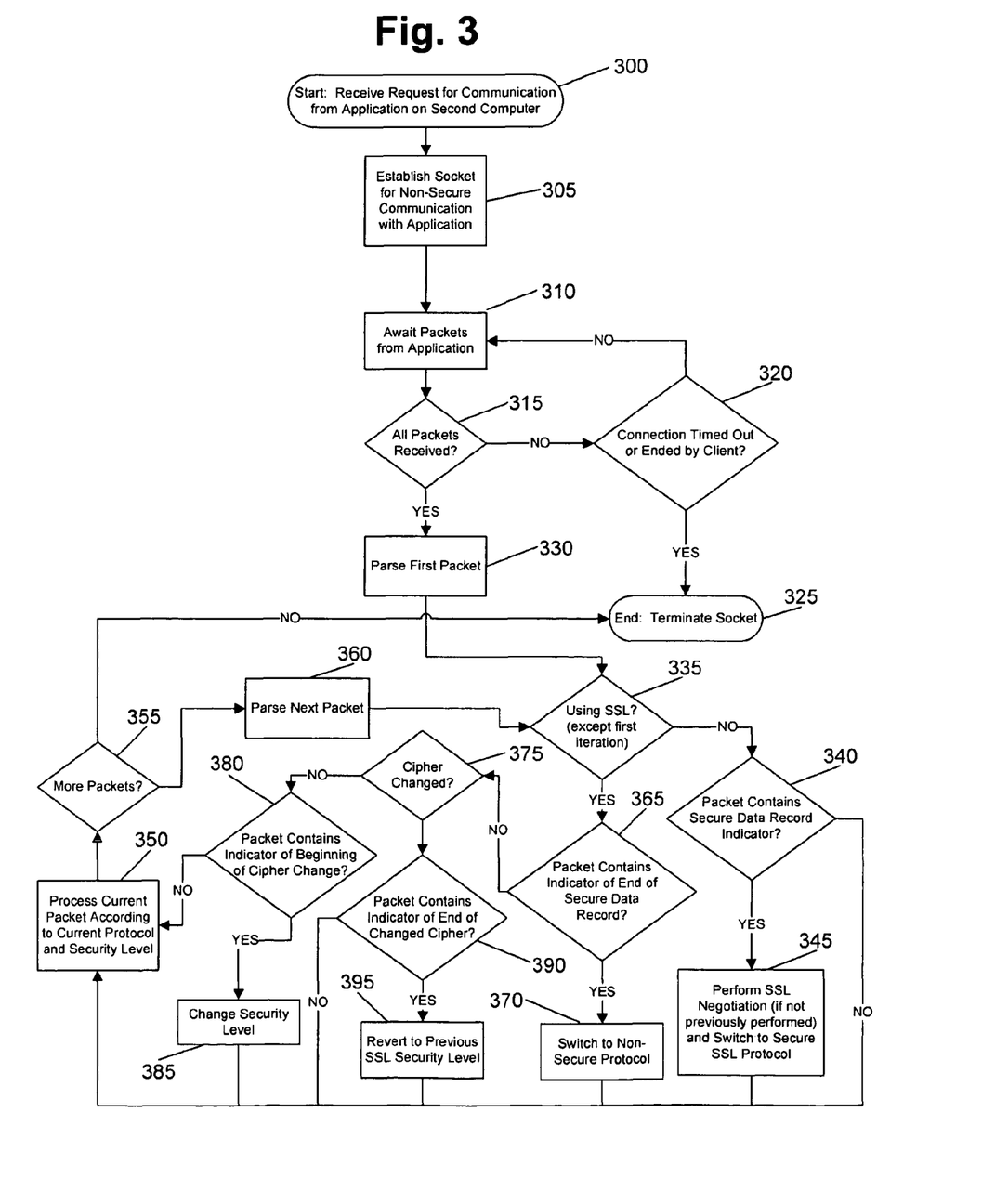
FIG. 3 is a flow diagram illustrating a process flow for processing both packets having multiple types of security and non-secure packets according to an embodiment of the present invention.

FIG. 3 is a flow diagram illustrating a process flow for processing both packets having multiple types of security and non-secure packets according to an embodiment of the present invention. In some embodiments, the process of FIG. 3 may be performed, for example, by computer 100 of FIG. 1 (i.e., the "first computer") via packet processing type determiner 145. In FIG. 3, the process flow begins with a first computer receiving a request for communication from an application running on a second computer at 300. The first computer then establishes a socket for non-secure communication with the application at 305. Once the first computer establishes a socket for non-secure communication with the application at 305, the first computer then awaits the packets from the application at 310. The first computer periodically checks whether packets from the application have been received on the socket. If all packets have not been received at 315 and the connection has either timed out or been ended by the application at 320, the socket is terminated at 325 and the process ends. On the other hand, if all of the packets have not been received at 315 and the connection is still active, the first computer continues to await packets from the client application on the socket at 310. In some embodiments, the first computer may begin processing the data packets before the entire communication is received, particularly if the communication is large.

Once all of the packets of the communication from the client application have been received at 315, the first computer parses the first packet at 330. For the first packet, the first computer does not need to make a determination of whether SSL is currently being used at 335 since the first computer is initially using a non-secure protocol, and will default to the "NO" branch. The first computer then checks whether the first packet contains a secure data record indicator indicating the beginning of a secure data record at 340. This indicator may be marked by a certain value in the out of band data byte of the packet. Per the above, the value 0xFA (denoted in hex, or 11111010 in binary) for the out of band data byte may indicate the beginning of a secure data record, for example.

If the secure data record indicator marks the beginning of a secure data record at 340, the first computer detects the secure data record indicator and if not previously performed, the first computer performs an SSL negotiation with the client computer and switches to SSL protocol at 345. Per the above, this negotiation may have been previously performed in some embodiments. The first and second computers negotiate the SSL session, exchanging information such as the SSL version number, cipher settings, and certificates. For instance, the cipher may use a 64 bit encryption strength initially. Again, while SSL is discussed in this example, it would be readily appreciated by one of ordinary skill in the art that TLS or any other applicable security protocol may be used. If the secure data record indicator does not mark the beginning of a secure data record, the first computer will not use SSL and will instead use the non-secure protocol. The first computer then processes the packet according to the current protocol and security level at 350. If more packets remain to be processed from the communication at 355, the first computer parses the next packet at 360 and repeats the process for the next packet at 335. If there are no more packets to process at 355, the first computer then terminates the socket at 325. While the socket is terminated in this example, one of ordinary skill in the art will readily appreciate that the socket may remain open to receive future communications from the application.

For subsequent packets, the first computer will check to see whether SSL is currently being used at 335. If the secure data record indicator of a previously processed packet indicated a secure data record, the protocol will have been switched to SSL and the "YES" branch of 335 will then be taken for subsequent packets. While SSL is being used, the first computer checks whether the current packet contains a secure data record indicator indicating the end of the present secure data record at 365. This indicator may also be marked by a certain value in the out of band data byte of the packet. For instance, per the above, the value 0xFE (denoted in hex, or 11111110 in binary) for the out of band data byte may indicate the end of the secure record. If the secure data record indicator marks the end of the secure data record, the first computer switches back to the non-secure protocol at 370.

If the secure data record indicator does not mark the end of the secure data record, the first computer detects the secure data record indicator and then determines whether the cipher for SSL has previously been changed at 375. In other words, the first computer checks whether the level of security has changed from the original SSL setting, such as from using a 64 bit key to using a 128 bit key. If the cipher level has not previously changed, the first computer checks whether the packet contains an indicator of the beginning of a data record that has a different security level and requires a cipher change. This indicator may also be marked by a certain value in the out of band data byte of the packet. For instance, the value 0xFC (denoted in hex, or 11111100 in binary) for the out of band data byte may indicate that a cipher change is needed for a data record.

If such an indicator is present, the first computer changes the security level at 385. The first computer processes a cipher change protocol data record with the second computer and uses new ciphers without requiring a full SSL renegotiation during the same session. The first computer and second computer may agree to change ciphers with whatever key strength that is desired: 64 bit, 128 bit, 192 bit, 256 bit or any other length. In this manner, the communicating computers can have complete control and flexibility over what ciphers they use for different resources. If such an indicator is not present, the first computer will not change the security and will continue to use the current SSL security level on future packets. The first computer then processes the packet according to the current protocol and security level at 350 and repeats the operations with respect to subsequent packets discussed above and illustrated in the flowchart of FIG. 3.

If the cipher has already been changed at 375, the first computer then checks whether an indicator of the end of the changed cipher is present in the packet at 390. This indicator may also be marked by a certain value in the out of band data byte of the packet. For instance, the value 0xFD (denoted in hex, or 11111101 in binary) for the out of band data byte may indicate that the data record for which the cipher change was needed has ended. If such an indicator is present, the first computer detects the indicator and reverts to the original SSL security level that existed prior to the cipher change at 395. The first computer then processes the packet according to the original SSL security level at 350 and repeats the operations with respect to subsequent packets discussed above and illustrated in the flowchart of FIG. 3.

Figure 4:
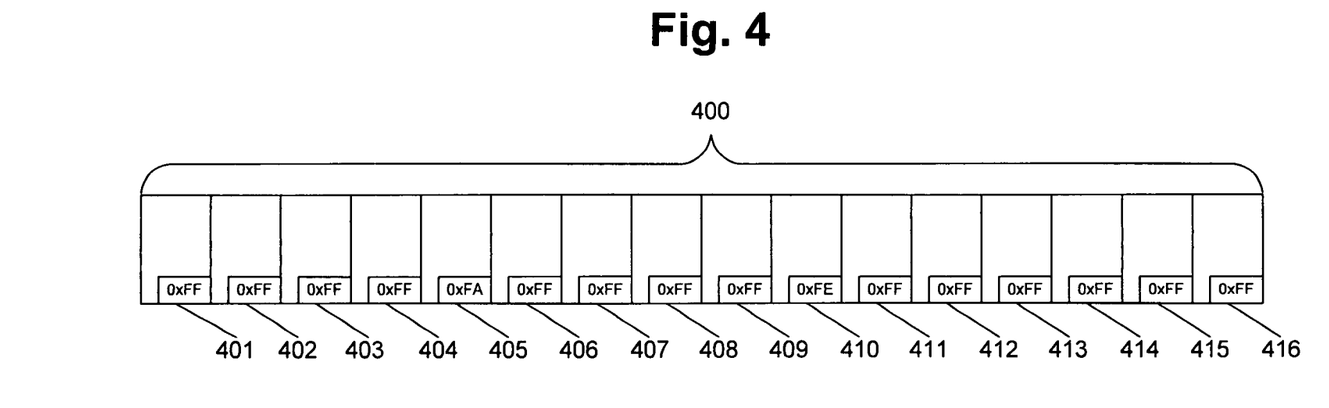
FIG. 4 is a block diagram illustrating packets of a communication received by a first computer from a second computer according to an embodiment of the present invention.

FIG. 4 is a block diagram illustrating packets of a communication 400 received by a first computer from a second computer according to an embodiment of the present invention. In this example, the packets 401-416 of the communication 400 are processed in a similar manner as the process discussed with respect to FIG. 2. The packets are in order and are processed from left to right.

In this case, the first four packets 401-404 contain a value of 0xFF in the out of band data byte, which is not an indication of the beginning of a secure data record, so these packets are processed by the first computer using a non-secure protocol. Packet 405 contains a secure data record indicator 0xFA in the out of band data byte indicating the beginning of a secure data record. Accordingly, the first computer switches to SSL for processing packets. Packets 406-409 contain a value of 0xFF in the out of band data byte, which is not an indication of the end of the secure data record, so these packets are processed by the first computer using SSL. Packet 410 contains a secure data record indicator 0xFE in the out of band data byte indicating the end of the secure data record. Accordingly, the first computer switches back to the non-secure protocol for processing packets. The remaining packets 411-416 contain a value of 0xFF in the out of band data byte, which is not an indication of the beginning of a secure data record, so these packets are processed by the first computer using the non-secure protocol. Once the first computer finishes processing of packet 416, all packets in the communication have been processed and the processing ends.

Figure 5:
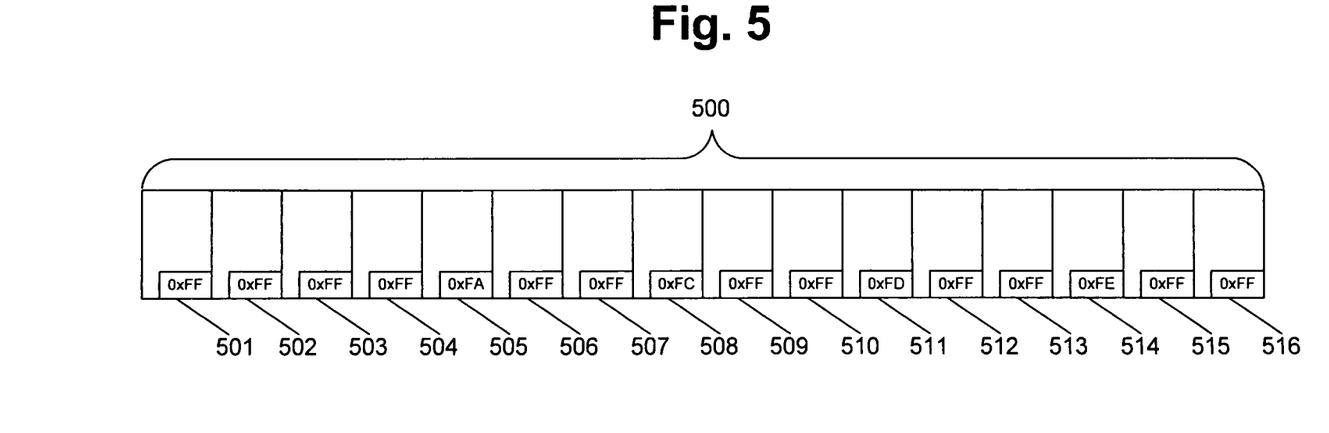
FIG. 5 is a block diagram illustrating packets of another communication received by a first computer from a second computer according to an embodiment of the present invention.

FIG. 5 is a block diagram illustrating packets of another communication 500 received by a first computer from a second computer according to an embodiment of the present invention. In this example, the packets 501-516 of the communication 500 are processed in a similar manner as the process discussed with respect to FIG. 3. The packets are in order and are processed from left to right.

In this case, the first two packets 501-504 contain a value of 0xFF in the out of band data byte, which is not an indication of any operation with respect to a secure data record, so these packets are processed by the first computer using a non-secure protocol. Packet 505 contains a secure data record indicator 0xFA in the out of band data byte indicating the beginning of a secure data record. Accordingly, the first computer switches to SSL with an initial security level for processing packets. Packets 506 and 507 contain a value of 0xFF in the out of band data byte, which is not an indication of any operation with respect to a secure data record, so these packets are processed by the first computer using SSL with the initial security level.

Packet 508 contains a value of 0xFC in the out of band data byte, which is an indicator of the beginning of a portion of the secure data record that has a different security level and requires a cipher change. Accordingly, the first computer changes the security level for SSL to a new security level. Packets 509 and 510 contain a value of 0xFF in the out of band data byte, which is not an indication of any operation with respect to a secure data record, so these packets are processed by the first computer using the new SSL security level. Packet 511 contains a value of 0xFD in the out of band data byte, which is an indicator of the end of the portion of the secure data record that has the different security level and required the cipher change. Accordingly, the first computer changes the security level for SSL back to the initial security level. Packets 512 and 513 contain a value of 0xFF in the out of band data byte, which is not an indication of any operation with respect to a secure data record, so these packets are processed by the first computer using the initial SSL security level. Packet 514 contains a secure data record indicator 0xFE in the out of band data byte indicating the end of the secure data record. Accordingly, the first computer switches back to the non-secure protocol for processing packets. The remaining packets 515 and 516 contain a value of 0xFF in the out of band data byte, which is not an indication of the beginning of a secure data record, so these packets are processed by the first computer using the non-secure protocol. Once the first computer finishes processing of packet 516, all packets in the communication have been processed and the processing ends.

As disclosed, an embodiment is a packet processing type determiner that facilitates both secure and non-secure communication for an application over a single port. Another embodiment is a packet processing type determiner configured to process packets having multiple types of security, as well as non-secure packets. In a computer that has many sockets open with applications running on one or more other computers, both the per-process and global limits on open descriptors may confine the number of applications with which a computer can communicate. Using the same TCP socket to allow both non-secure and secure communications leaves sockets free for both existing and additional applications. In the case of a server, such an implementation may increase scalability in terms of socket connections with applications running on client computers.

One having ordinary skill in the art will readily understand that the invention as discussed above may be practiced in a different order, and/or with hardware elements in configurations that are different than those that are disclosed. Therefore, although the invention has been described based upon these preferred embodiments, it would be apparent to, and readily appreciated by, those of ordinary skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. A non-transitory computer readable medium having instructions stored thereon that, when executed by a processor, cause the processor to perform a process that facilitates both secure and non-secure communication over a single port, the process comprising:
    processing a plurality of data packets received through a first Transmission Control Protocol (TCP) connection over a single socket using Hypertext Transfer Protocol (HTTP), wherein the single socket is associated with the single port, wherein the processing comprises receiving an indication of a number of data packets to be received;
    parsing each received data packet for a first out of band data byte denoting a beginning of a secure data record;
    when a packet with the first out of band data byte is detected, using Secure Sockets Layer (SSL) with a first cipher to process the packets received through the first TCP connection over the single socket;
    when a packet is detected with a second out of band data byte denoting a cipher change, using SSL with a second cipher to process the packets that is different from the first cipher, wherein the change occurs without requiring a full SSL renegotiation;
    when a packet is detected with a third out of band data byte denoting an end of the changed cipher, changing back to using SSL with the first cipher to process the packets received through the first TCP connection over the single socket; and
    when a packet is detected with a fourth out of band data byte denoting an end of the secure data record, while keeping the first TCP connection active, returning to processing packets received using HTTP through the first TCP connection over the same single socket that subsequently follow the fourth out of band data byte.

2. The computer readable medium of claim 1, further comprising waiting until all of the packets are received before parsing each received data packet.

3. The computer readable medium of claim 1, wherein the socket is non-secure by default.

4. The computer readable medium of claim 1, wherein the first cipher has a different key strength than the second cipher.

5. The computer readable medium of claim 1, wherein the socket is an application programming interface of an operating system.

6. The computer readable medium of claim 1,
    wherein the parsing of each received data packet begins before all data packets of the communication are received.

7. A packet processing type determiner that facilitates both secure and non-secure communication over a single port, comprising:
    a processor programmed to perform as:
        a non-secure packet processing module configured to process a plurality of data packets received through a first Transmission Control Protocol (TCP) connection over a single socket using Hypertext Transfer Protocol (HTTP), wherein the single socket is associated with the single port, wherein the processing comprises receiving an indication of a number of data packets to be received;

a data indicator checking module configured to parse each received data packet for a first out of band data byte denoting a beginning of a secure data record; and a secure packet processing module configured to use Secure Sockets Layer (SSL) with a first cipher to process the packets received through the first TCP connection over the single socket when the first out of band data byte is detected;

when a packet is detected with a second out of band data byte denoting a cipher change, using SSL with a second cipher to process the packets that is different from the first cipher, wherein the change occurs without requiring a full SSL renegotiation;

when a packet is detected with a third out of band data byte denoting an end of the changed cipher, changing back to using SSL with the first cipher to process the packets received through the first TCP connection over the single socket; and when a packet is detected with a fourth out of band data byte denoting an end of the secure data record, while keeping the first TCP connection active, returning to processing packets received using HTTP through the first TCP connection over the same single socket that subsequently follow the fourth out of band data byte.

8. The packet processing type determiner of claim 7, wherein the port is non-secure by default.

9. The packet processing type determiner of claim 7, further comprising waiting until all of the packets are received before parsing each received data packet.

10. The packet processing type determiner of claim 7, wherein the socket is an application programming interface of an operating system.

11. The packet processing type determiner of claim 7, wherein the first cipher has a different key strength than the second cipher.

12. The packet processing type determiner of claim 7, wherein the parsing of each received data packet begins before all data packets of the communication are received.

13. A computer-implemented method that facilitates both secure and non-secure communication over a single port, comprising:

processing a plurality of data packets in a communication received through a first Transmission Control Protocol (TCP) connection over a single socket using Hypertext Transfer Protocol (HTTP), wherein the single socket is associated with the single port, wherein the processing comprises receiving an indication of a number of data packets to be received;

parsing each received data packet of the communication for a first out of band data byte denoting a beginning of a secure data record in the communication; and when the first out of band data byte is detected in a packet, using Secure Sockets Layer (SSL) with a first cipher to process the packet, as well as packets received through the first TCP connection over the single socket;

when a packet is detected with a second out of band data byte denoting a cipher change, using SSL with a second cipher to process the packets that is different from the first cipher, wherein the change occurs without requiring a full SSL renegotiation;

when a packet is detected with a third out of band data byte denoting an end of the changed cipher, changing back to using SSL with the first cipher to process the packets received through the first TCP connection over the single socket; and when a packet is detected with a fourth out of band data byte denoting end of the secure data record, while keeping the first TCP connection active, returning to processing packets received using HTTP through the first TCP connection over the same single socket that subsequently follow the fourth out of band data byte.

14. The method of claim 13, further comprising waiting until all of the packets are received before parsing each received data packet.

15. The method of claim 13, wherein the socket is non-secure by default.

16. The method of claim 13, wherein the socket is an application programming interface of an operating system.

17. The method of claim 13, wherein the first cipher has a different key strength than the second cipher.

18. The method of claim 13, wherein the parsing of each received data packet begins before all data packets are received.

* * * * *

UNITED STATES PATENT AND TRADEMARK OFFICE
CERTIFICATE OF CORRECTION

PATENT NO. : 8,914,631 B2  
APPLICATION NO. : 12/496270  
DATED : December 16, 2014  
INVENTOR(S) : Shukla Page 1 of 1

It is certified that error appears in the above-identified patent and that said Letters Patent is hereby corrected as shown below:

On the Title Page, References Cited

On page 2, column 2, under Other Publications, line 9, delete "boulderibm" and insert -- boulder.ibm --, therefor.

On page 2, column 2, under Other Publications, line 22, delete "Systems:;" and insert -- Systems; --, therefor.

Signed and Sealed this  
Fourth Day of August, 2015

Michelle K. Lee  
*Director of the United States Patent and Trademark Office*